United States Patent [19]

Thompson

[11] Patent Number: 4,495,400
[45] Date of Patent: Jan. 22, 1985

[54] METHOD AND APPARATUS FOR POSITIONING A WELDING TORCH IN AUTOMATIC ELECTRIC WELDING

[75] Inventor: Floyd M. Thompson, Houston, Tex.

[73] Assignee: Crutcher Resources Corporation, Houston, Tex.

[21] Appl. No.: 371,737

[22] Filed: Apr. 26, 1982

[51] Int. Cl.³ .............................................. B23K 9/12
[52] U.S. Cl. ........................... 219/125.12; 219/124.22
[58] Field of Search ..................... 219/125.12, 124.34, 219/124.22, 137 R

[56] References Cited

U.S. PATENT DOCUMENTS

| | | |
|---|---|---|
| 2,944,141 | 7/1960 | Lovrenich . |
| 3,262,006 | 7/1966 | Sciaky et al. . |
| 3,530,359 | 9/1970 | Grist . |
| 3,646,309 | 2/1972 | Smith, Jr. et al. . |
| 3,777,115 | 12/1973 | Kazlauskas et al. . |
| 3,783,222 | 1/1974 | Gwin et al. . |
| 3,989,921 | 11/1976 | Ohi et al. . |
| 4,151,395 | 4/1979 | Kushner et al. ............... 219/137 R |
| 4,158,124 | 6/1979 | Connell ........................ 219/125.12 |
| 4,302,655 | 11/1981 | Edling ........................... 219/125.12 |
| 4,336,440 | 6/1982 | Cook et al. .................... 219/124.34 |

FOREIGN PATENT DOCUMENTS

| | | |
|---|---|---|
| 1517481 | 7/1978 | United Kingdom . |
| 147705 | 11/1962 | U.S.S.R. . |
| 253974 | 4/1970 | U.S.S.R. . |
| 288189 | 2/1971 | U.S.S.R. . |
| 371041 | 5/1973 | U.S.S.R. . |

Primary Examiner—Clifford C. Shaw
Attorney, Agent, or Firm—Richards, Harris & Medlock

[57] ABSTRACT

This invention relates to automatic welding of confronting edges of two bodies between which is a groove to be filled with filler material and, more particularly, to conditioning, processing and use of control signals for automatic operation.

10 Claims, 10 Drawing Figures

METHOD AND APPARATUS FOR POSITIONING A WELDING TORCH IN AUTOMATIC ELECTRIC WELDING

BACKGROUND ART

Semi-automatic welding operations where filler wire is utilized in connection with welding adjacent faces of materials such as pipelines is known. In U.S. Pat. No. 4,151,395, the problem of welding joints by filling grooves defining a weld path between work pieces is described. Large pipe sections are thus joined together in the end-to-end relationship. Thus, it is common practice to move a welding heat source such as an arc welding torch or like instrument along a predetermined weld path relative to the work while fusing and depositing filler metal in the gap from a consumable electrode source.

A welding machine is disclosed in said patent which travels on a guideband secured near the end of a pipe section which is to be welded to an adjacent pipe section. As such welding machine travels along the length of the groove to be filled, the arc is oscillated laterally, weaving back and forth across the groove. It is to be controlled in center position as well as oscillation width.

Various proposals have been made for tracking a groove between adjacent parts with external sensors of optical, mechanical or magnetic types suggested.

In U.S. Pat. No. 4,151,395, the signals employed are conditioned where characteristics of the arc itself are sensed for providing the necessary signal input.

In U.S. Pat. No. 4,158,124, a system is disclosed wherein the weld current is integrated as it approaches a groove sidewall. The integral is then compared with a reference voltage so that when the arc reaches a position within a predetermined proximity of the sidewall, the lateral travel will be arrested and thereafter reversed to travel under similar control toward the opposite sidewall. The maintenance of center line position and width are both accomplished in the same operation.

DISCLOSURE OF THE INVENTION

The present invention is directed to a system in which the control signals are generated and conditioned to be more reliable welding in operations than heretofore possible.

In accordance with the invention, automatic arc welding involves a weld torch which consumes an electrode to deposit filler material in a weld groove while weaving across the groove during travel along the length of the groove. Means are provided for producing an arc current integral signal representative of the integral of the difference between the arc current near the end of each lateral traverse and the base arc current at the center of the traverse. Means are provided to arrest travel of the arc on each traverse each time the integral reaches a reference value.

BRIEF DESCRIPTION OF THE DRAWINGS

For a more complete understanding of the invention, reference may now be had to the following description taken in conjunction with the accompanying drawings in which.

DETAILED DESCRIPTION

Figure 1:
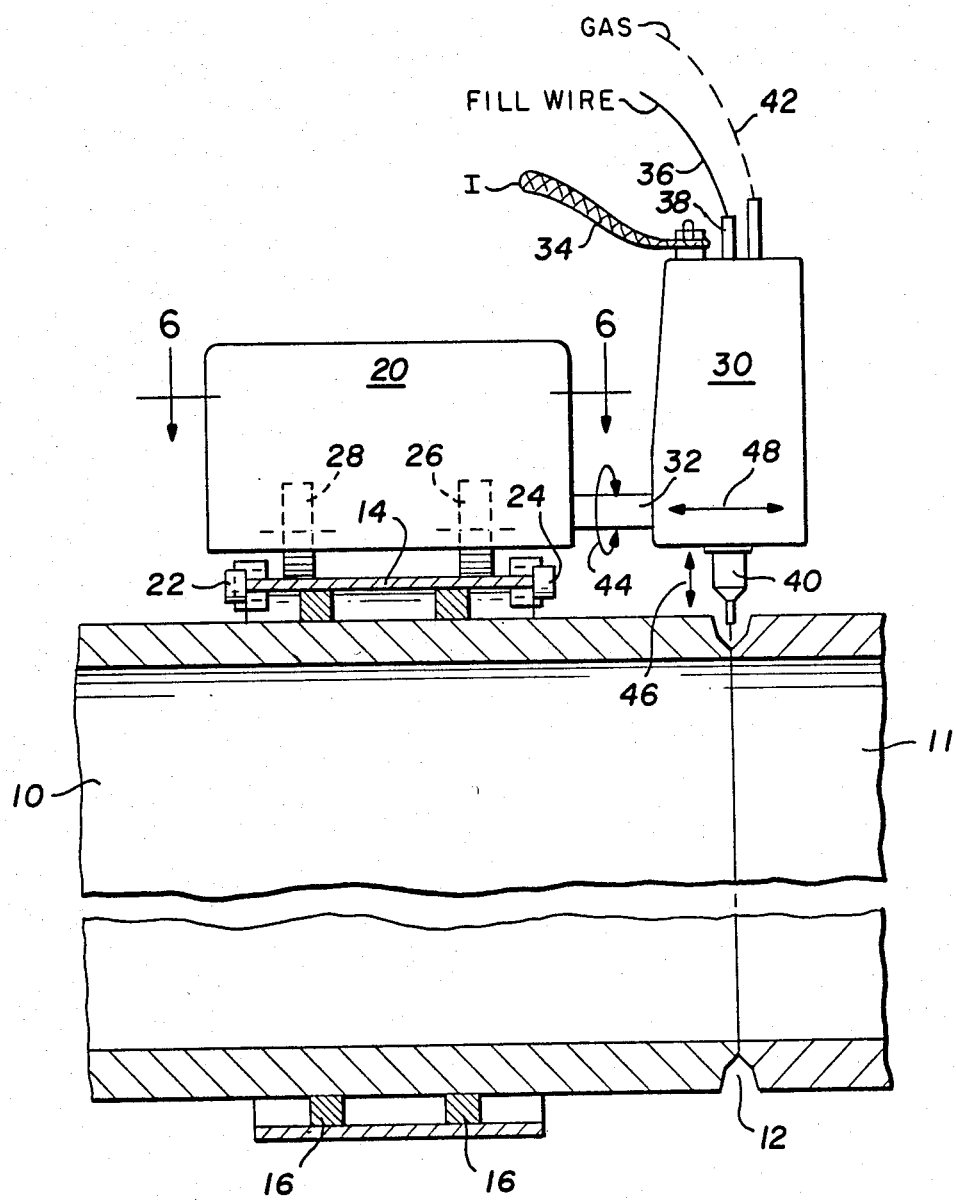
FIG. 1 illustrates a system according to the present invention in a pipeline welding operation.

FIG. 1 illustrates a pipeline welding operation wherein a pipe 10 is adjacent to and confronts in an end-to-end relation a second pipe 11. The ends of pipes 10 and 11 are beveled so that together, a groove 12 is formed along which pipe material is to be melted and fused while depositing filler material in the groove through use of a gas shielded arc.

A guideband 14 is secured to the outer surface of pipe 10 and is spaced therefrom by spacers 16. A welding bug 20 is mounted on track 14 and comprises a first set of followers 22 and a second set of followers 24, each comprising three rollers which engage and follow the inner, edge and outer surfaces of band 14. By this means bug 20 will follow a path around pipe 10 which is generally a constant distance from groove 12. Bug 20 is provided with a pair of drive wheels 26 and 28 which engage the outer surface of band 14 and which are propelled by a suitable motor (not shown) for moving the bug 20 along band 14 at controlled velocities.

In accordance with the present invention, a torch assembly 30 is mounted on a compound shaft 32 which extends from the side of bug 20. Torch assembly 30 is supplied by way of a cable 34 with welding current. Filler wire 36 is supplied by way of a guide tube 38 to pass downward through torch assembly 30 and emerge through a nozzle 40. Shielding gas from a suitable source is supplied by way of tube 42 to shield the arc at the end of filler wire 36 as it emerges from nozzle 40 and for the duration of such time as an arc exists between the filler wire tip below nozzle 40.

Current in the arc is sensed and utilized for control of movement of the torch assembly 30 relative to bug 20. The compound shaft 32 provides for rotation of the torch assembly 30 about the axis of shaft 32 as indicated by arrow 44 so that the head angle between the nozzle 40 and pipes 10 and 11 can be selectively adjusted.

Motion is also conveyed through shaft 32 so that the distance between the nozzle 40 and the groove 12 can be varied in accordance with arrow 46.

Further, the torch assembly 30 can be moved laterally as indicated by arrow 48 to weave back and forth across the gap 12 with the welding tip extending from nozzle 40.

OPERATION

Before describing the present signal processing and utilization system, it will be helpful to outline in sequence the operations that are to be achieved in automatic operation.

The following operations take place:

(1) The bug 20 is mounted on the guideband 14.

(2) An electrical master switch is turned on.

(3) The system then undergoes a routine to seek the surface of pipe 10 or 11:

(a) First, the weld head angle is set typically to 6 to 7 degrees either lead or lag depending upon position and direction. The head angle can be set up to ±45° from perpendicular as per arrow 44.

(b) After the head angle is set, the system undertakes to seek the work. The torch is lowered until it makes electrical contact with the work. A constant current source is connected to an electrical conductive part of the welding nozzle and change in that circuit is sensed.

(c) After the work has been touched, the torch is backed up to the point that represents the desired filler wire stick-out length. The filler wire 36 is then fed through the torch assembly 30 until the wire makes contact with the work.

(d) The torch then backs up approximately ¼".

(4) Next, the welding groove is located:

(a) In the pipeline application, the approximate position of guideband 14 with respect to the groove 12 is known. The torch assembly 30 is moved by shaft 32 to a predetermined position, approximately at the center of groove 12.

(b) Nozzle 40 is then lowered approximately ¼". to enter groove 12. Then nozzle 40 is driven to the right to contact the right sidewall of groove 12 and then driven to the left to contact the left sidewall, both being sensed upon electrical contact.

(5) The position data for the right sidewall is stored and the position data for the left sidewall is stored. The right is then subtracted from the left and the difference divided in half to determine the groove center. The center position data is stored.

(6) Nozzle 40 is then driven down into the groove as per arrow 46 until electrical contact is made at the groove center. This finds the bottom of the weld site by electrical contact. The torch then backs up approximately 1/16". The right side is contacted again and the left side is contacted again and this now provides the original start width of oscillation. The nozzle 40 then is moved back to the center line.

(7) The gas and electrical power are then turned on and a gas pre-purge cycle extends a period of time of approximately ½ second during which gas flows to purge air out of the torch and the gas line 42.

(8) Upon completion of the purge cycle, the wire feeder is turned on to commence welding. The arc is started when the wire touches the work.

(9) During a quarter-second delay next occurring, nothing is done with the torch. Everything is left in position in the groove center while the arc is established.

(10) After the quarter-second delay, oscillation starts to the predetermined width for a total of 4 cycles. The width is as determined by the original mechanical width that was set by the seek routine. During the first 4 cycles, a width count is accumulated as an actual integration constant:

(a) The torch moves from center to the right on the first excursion.

(b) A down counter is loaded with a very large number. The down counter is turned on at an aperture window for the integration which begins a given distance away from the sidewall, approximately 20 thousandths of an inch from the sidewall In the first 4 cycles, every time the arc approaches the sidewall, an integration window opens.

(c) The counter counts down from a preset number at a rate representative of the actual current density while the arc nears the sidewall (d) The analog value of current is converted to frequency which is, thus, variable and proportional to the analog input current minus base line current as sampled at the center of groove 12.

(e) The counter counts down until the torch reaches the original mechanical width limit and stops the counter. The counter contents are read. The number in the counter is subtracted from the original preset value and that difference becomes a value of the integration constant, C. The same operation is repeated a total of 8 times, i.e., 4 complete cycles. The 8 samples are taken and a root mean square average is obtained.

(f) The root mean square is the average of the number left in the counter. That then becomes the integration constant, C, for the remainder of the weld.

(12) During the first 4 cycles, each time the torch passes through center line, one weld current sample is taken. To that, one sample is added for every subsequent center crossing.

(13) After the first 4 cycles, automatic centering circuits turn on. The first 4 cycles are fixed width, as fixed by the sidewall located in search routine. Once the torch to work current is determined and the integration constant, C, is set, those values are used as reference for the rest of the weld.

(14) On the 5th cycle, having completed extracting the above data, a sample is taken at the center line and compared to the original R.M.S. average and a correction is made if the center line sample is lower or higher. If the current is higher than the original average, the torch is moved up. The relationship is such that approximately 1 millimeter change in filler wire stick-out causes 1% change in current density.

(15) The arc proceeds toward the sidewall until the integration start point is again passed, i.e., approximately 20 thousandths from where the sidewall was. This distance is a variable that can be selected depending on the desired process. Normally about 20 thousandths is selected. At that point, the down counter loads the integration constant, C, i.e., the average of the number determined over the first 4 cycles. With that number in the counter, a current subtraction takes place in which the base line current is subtracted.

The base line current is the center value and is subtracted from the incoming welding current. The difference is then integrated from the start of the integration window. The integration takes place over a small window at the ends of each traverse.

(16) The down counter acts as an integrator or accumulator. When it reaches zero, counting down from a preset number, the weave motor stops.

(17) A dwell is established at the end of each traverse. Then the torch cycles back across the weld.

(18) During the dwell time, a torch to work correction is made. Information collected at the center is used for corrections made during the dwell time. That prevents interaction between the torch to work control and the automatic centering.

FIGS. 2–5

Figure 2:
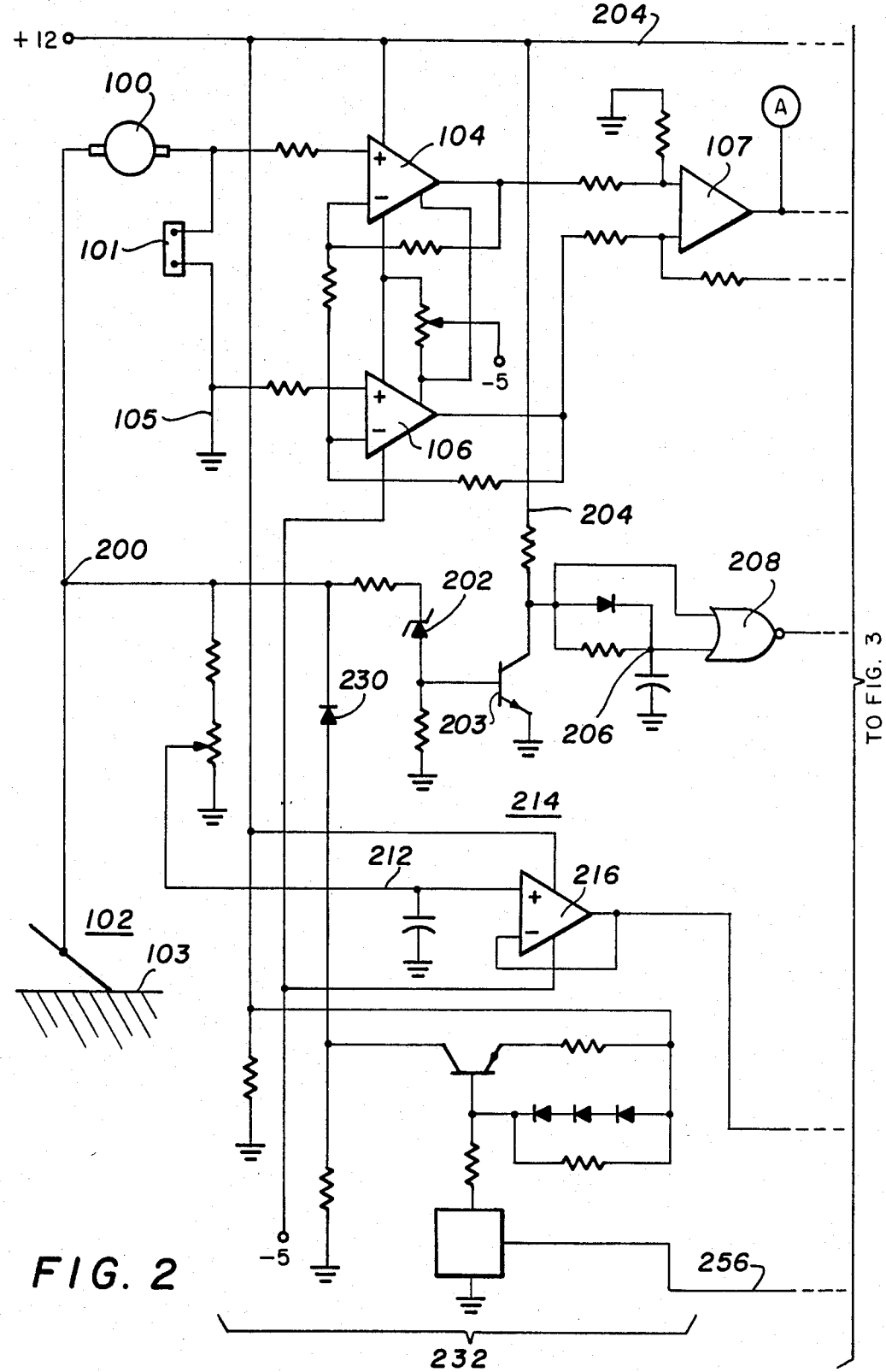
FIGS. 2, 3 and 4 comprise a circuit diagram for signal conditioning and control in operating a system such as shown in FIG. 1.
Figure 3:
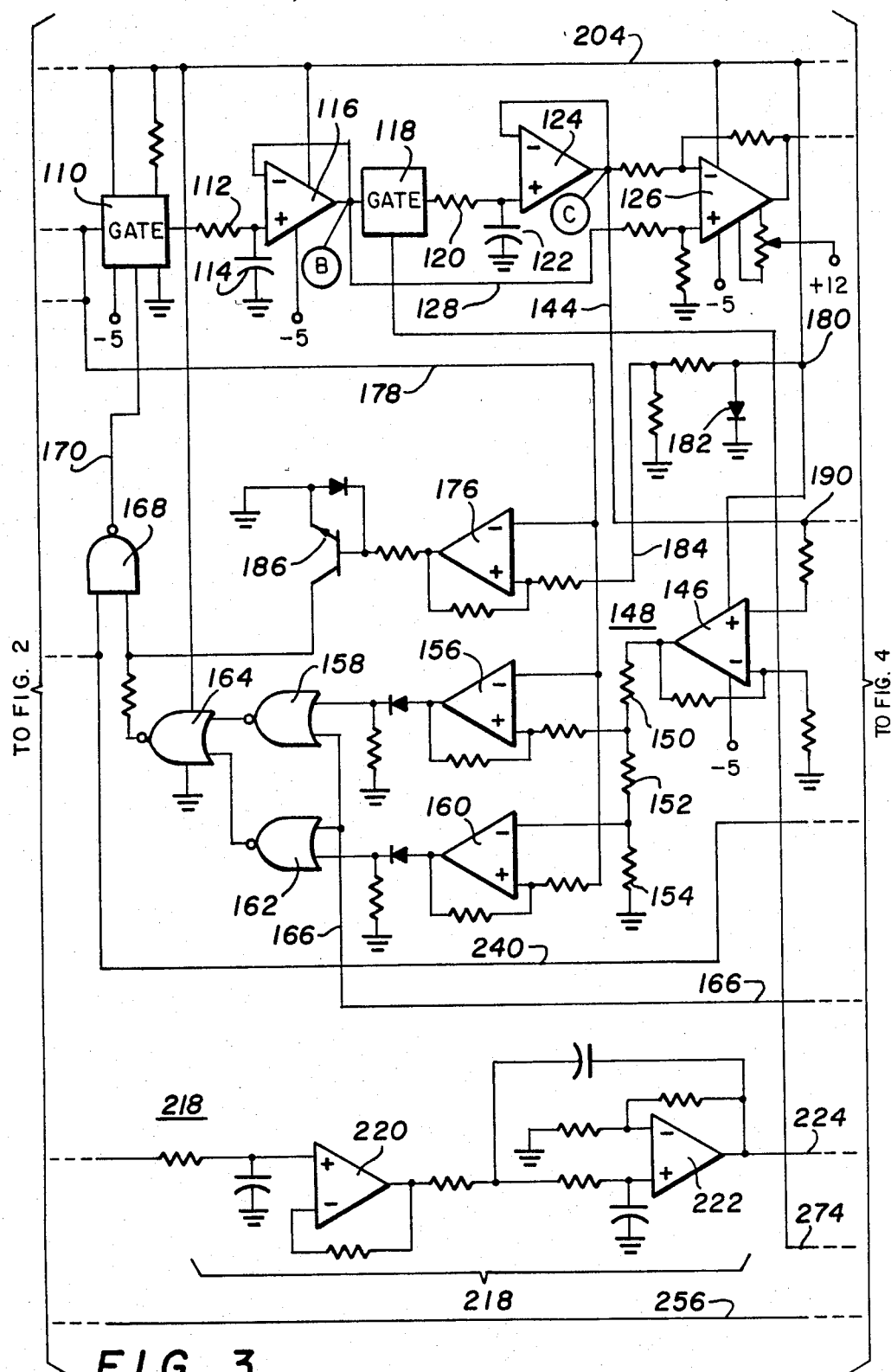
Figure 4:
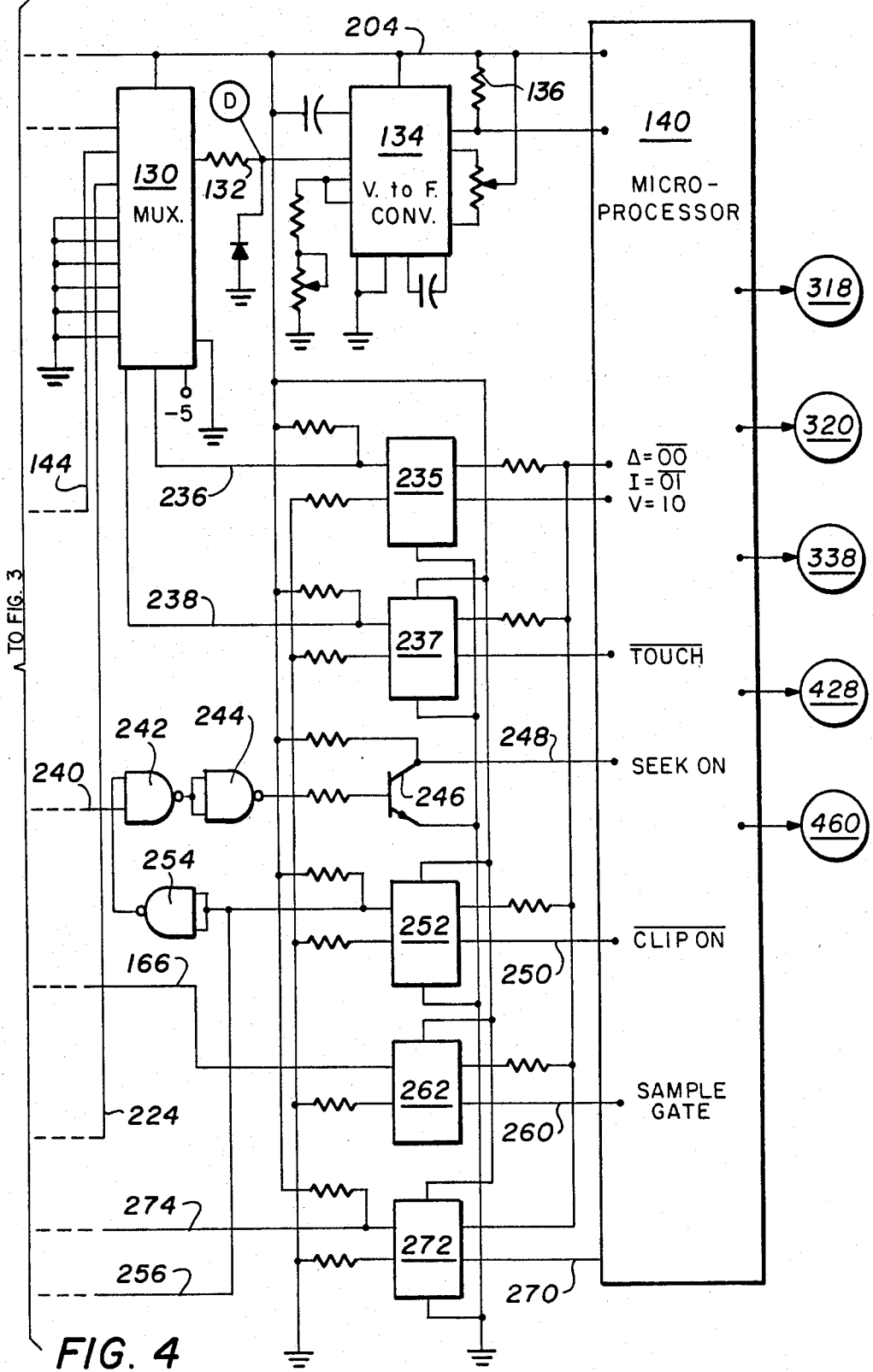

With the foregoing in mind as to functions to be performed, refer now to the signal conditioning and use circuit of FIGS. 2–4 which are to be joined together to form a composite circuit diagram.

In FIGS. 2-4, a welding control system has been illustrated partially in block diagram form.

A weld current generator 100 is connected to a current shunt 101 at its negative voltage terminal. The positive terminal is connected to a welding torch 102 which serves to contact a work piece 103.

The terminals of shunt 101 are connected to the inputs terminals of an amplifier. More particularly, the positive terminal of shunt 101 is connected to an input of an amplifier 104. The negative terminal of the shunt 101 is connected to a ground terminal 105 and to the input to an amplifier 106. Amplifiers 104 and 106 together with amplifier 107 provide a gain of about 25 for the voltage across shunt 101.

The output of amplifier 107 is then connected to a transmission gate 110. The output of gate 110 is connected to an integrator sample and hold unit comprising resistor 112 and capacitor 114. The voltage across capacitor 114 is then applied to a voltage follower amplifier 116. The output of amplifier 116 is then connected by way of a transmission gate 118 to a second sample and hold integrator comprising resistor 120 and capacitor 122. The voltage across capacitor 122 is then connected to a voltage follower amplifier 124 whose output is connected to the input of a subtracting amplifier 126. The second input of subtracting amplifier 126 is provided by way of line 128 which leads from the output of voltage follower 116. Thus, the voltage output from the subtractor circuit represents the difference between the voltage across the capacitor 122 and the voltage across the capacitor 114.

Integrator 112, 114 has a relatively short time constant. By way of example, resistor 112 may be 33,000 ohms and capacitor 114 may be 0.1 microfarads to provide an integrator having a corner frequency of about 300 Hz. In contrast, the integrator 120, 122 may be a corner frequency of about 68 Hz where, for example, resistor 120 is 68,000 ohms and capacitor 122 is 1.0 microfarads.

The output of subtractor 126 is then applied to an analog multiplexing gate 130. The output of gate 130 is then applied by way of resistor 132 to the input to a voltage-to-frequency converter 134. The output of converter 134 then appears across resistor 136 at the input of a microprocessor controller 140.

In the portion of the system of FIGS. 2-4 thus far described, provision has been made for sensing the current flow through the shunt 101 and for providing a short-time constant integral signal from integrator 112-114 and a long-time constant integral signal from integrator 120, 122. The two signals are then subtracted in unit 126 and applied by way of multiplexer 130 to voltage-to-frequency converter 134 to provide an output signal, the utilization of which will be described further.

Figure 5:
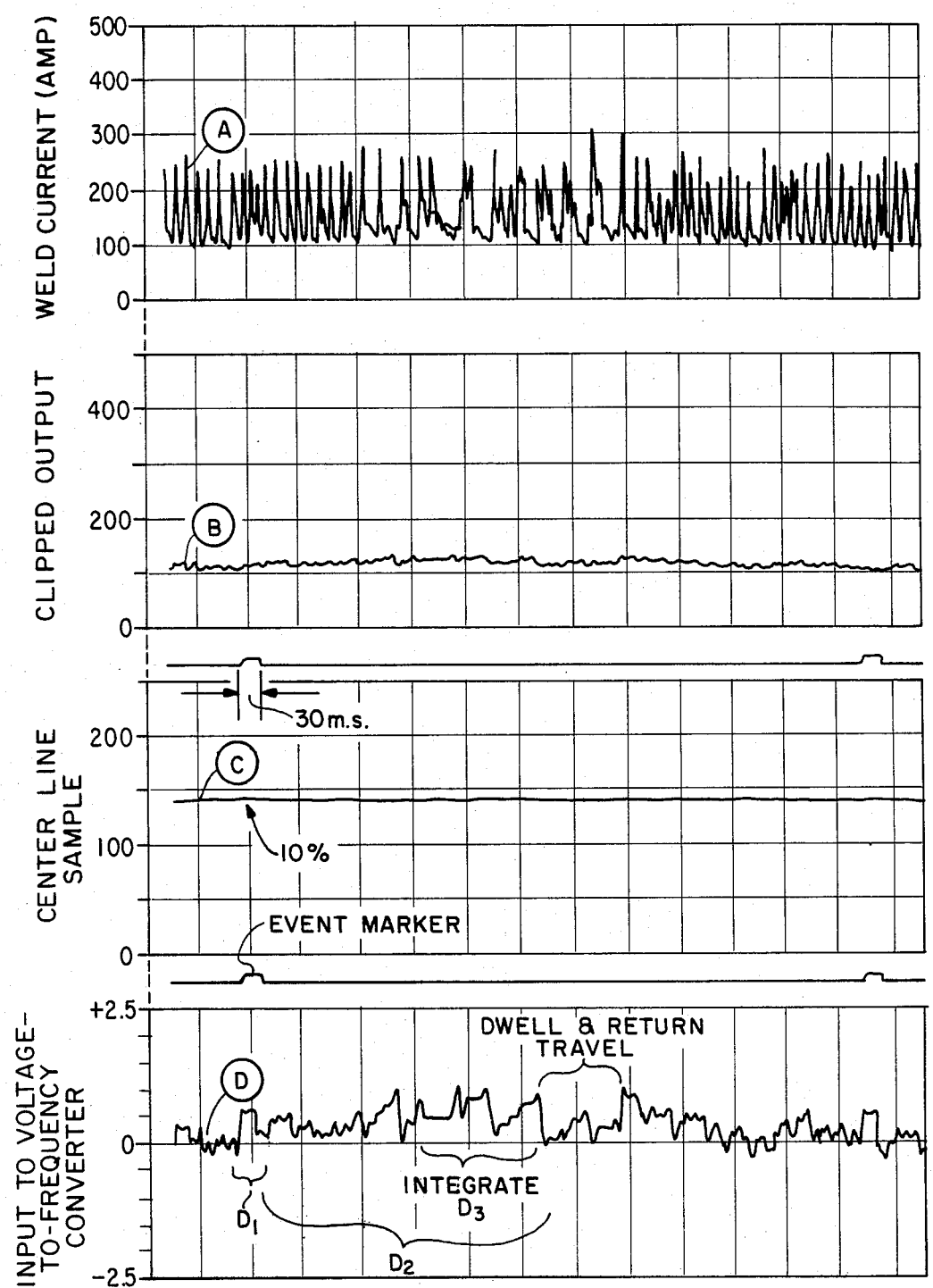
FIG. 5 illustrates wave forms of the signals appearing at selected points in the system of FIG. 2–4.

Trace A of FIG. 5 depicts a wave form of typical weld current as appearing across shunt 101. Because of the unpredicable and erratic nature of the current flow in a welding arc, utilization of the sampled arc current can be significantly enhanced by selectively filtering.

As shown in FIGS. 2-4, provision is made for clipping the weld current when it exceeds a predetermined limit above a normal selected level or when it falls below by a predetermined amount the same selected level.

More particularly, it will be noted that the output of the voltage follower 124 is applied by way of line 144 to the input of an amplifier 146 which provides an output which is applied to a voltage divider 148. The output voltage from amplifier 146 is twice the magnitude of the input voltage.

The voltage divider 148 is a precision voltage divider. It includes three resistors in series. In a preferred embodiment, resistor 150 was 4.02K ohms. Resistor 152 was 1.5K ohms. Resistor 154 was 4.53K ohms. The circuit controls clipping of the weld current anytime the current exceeds by 20% a preset value and will clip anytime it falls below 90% of the preset value.

More particularly, as shown in FIGS. 2-4, the voltage at the juncture between resistors 150 and 152 is applied to a Schmidt trigger unit 156, the output of which is applied to one input of a NOR gate 158. Similarly, the juncture between resistors 152 and 154 is connected by way of a Schmidt trigger 160 to a second NOR gate 162. Gates 158 and 162 are then connected to the respective inputs of a NOR gate 164. Gates 158 and 162 are controlled or enabled by a suitable control voltage on line 166.

The output of NOR gate 164 is connected to an input of an NAND gate 168, the output of which is applied by channel 170 to the control input of the transmission gate 110.

In operation, when gate 158 is enabled, if the current through shunt 101 exceeds a preset level by more than 20%, then the transmission gate 110 is disabled and the voltage across the integrator 112, 114 remains fixed. Similarly, if the weld current falls more than 10% below the normal fixed value, then gate 162 is enabled and transmission gate 110 is disabled, again holding the voltage on the integrator 112, 114 at a fixed value.

In operation, when gate 158 is enabled, if the current through shunt 101 exceeds a preset level by more than 20%, then the transmission gate 110 is disabled and the voltage across the integrator 112, 114 remains fixed. Similarly, if the weld current falls more than 10% below the nominal fixed value, then gate 162 is enabled and transmission gate 110 is disabled, again holding the voltage on the integrator 112, 114 at a fixed value.

In addition to the foregoing circuits which provide for clipping action, there is also provided a low current clipper which involves control of a Schmidt trigger 176. More particularly, the voltage at the output of amplifier 107 is supplied by way of channel 178 to one input of Schmidt trigger 176. Thus, the current on line 178 is to be compared against a reference. The reference voltage is supplied from a terminal 180. The reference voltage appears across diode 182. The voltage across diode 182 is divided down by resistors connected thereto and the reference voltage is applied by way of channel 184 to the second input of the Schmidt trigger 176. The output of trigger 176 is then applied by way of transistor 186 to one input of the NAND gate 168.

In operation, the circuit is arranged so that where the nominal welding current is from 150 to 200 amperes, the low current clipper circuit will operate to disable the transmission gate 110 when the weld current drops to a level of the order of 90 amperes.

By the foregoing treatment of the weld current, a difference voltage is applied through multiplexer 130 to the voltage-to-frequency converter 134. In addition, the output of the long-term integrator 120, 122 is applied by way of channel 190 to a second input of multiplexer 130. This is to supply a current dependent signal from which there is developed a base current signal, i.e., a sample representing current value at the center of the traverse.

Having treated the processing of the current sample from the shunt 101, there will now be described processing of the arc voltage in order to provide a control for the transmission gate 110 when the arc voltage drops below a predetermined level. Assume that the arc voltage is normally about 25 volts.

The arc voltage from terminal 200 is applied by way of zener diode 202 to the input or base of transistor 203. By operation of diode 202 when the arc voltage falls below the diode threshold of about 6 volts, then transistor 203 is turned off, causing the collector to rise to the voltage level of power supply 204. The voltage at the collector terminal is then applied by way of a time delay circuit 206 to a NOR gate 208 which in turn is connected to a second input of NAND gate 168. By this means, sampling of the current from shunt 101 is arrested if the arc voltage falls below the level set in the voltage clipper circuit.

It will be further noted that the terminal 200 is connected by way of channel 212 to an arc voltage sample circuit 214. The arc sample circuit includes a buffer amplifier 216 and a low pass filter 218 which has a corner frequency, for example, of about 5 Hz. Filter 218 is a third order low pass filter. It includes amplifiers 220 and 222 connected by way of channel 224 to a third input of the multiplexer 130. By this means, the arc voltage level can be monitored and utilized by way of a signal output from the voltage-to-frequency converter 134 and selectively appearing across the impedance 136.

Terminal 200 is also connected by way of a diode 230 to a circuit 232 which comprises a constant current source to be used by the system when seeking to determine the location of the walls of the weld groove as earlier described.

The microprocessor 140 is provided to control use of the signals appearing across the output impedance 136 and for providing control inputs to the remainder of the system.

One of the function of the microprocessor 140 is to provide a two-bit address signal for the control of multiplexer 130. When the system is in a subtractor mode, that is when the voltage across the output impedance 136 is to represent on a frequency variable basis the difference between the signals at the input of subtractor 126, the voltage from coupler 235 on line 236 and the voltage from coupler 237 on line 238 will be high. When the voltage across impedance 136 is to represent the value of the current as at the mid-point of its traverse, then line 236 will be high and 238 will be low. When the signal across impedance 136 is to represent the voltage at terminal 200, the signal on line 236 will be low and the signal on line 238 will be high. The control of multiplexer 130 is programmed in processor 140.

So long as the output of the NOR gate 208 is low, i.e., the weld voltage exceeds about 6 volts, the output will be low. The output of NOR gate 208 is connected by way of channel 240 to one input of a NAND gate 242, the output of which is connected to both inputs of NAND gate 244, whose output in turn is connected to the base of transistor 246. The collector of transistor 246 is connected to output terminal 248 leading to microprocessor 140.

In the seek routine, when the welding tip 102 touches the work piece, the weld voltage drops to a low value such that the state on line 240 is changed. The change is then reflected by a change in the state at the output terminal 248 to signal that a sidewall has been touched.

Terminal 250 leads from microprocessor 140 to an optical coupler 252, the output of which is connected to both inputs of a NAND gate 254. The output of NAND gate 254 controls the second terminal of NAND gate 242 to enable the seek routine to be undertaken.

By way of channel 256, the output of the optical coupler 252 serves to turn on the constant current source 232. This enables the seek routine to be undertaken at a time when the arc voltage is not turned on.

Terminal 260 leads from microprocessor 140 to an optical coupler 262, the output of which is connected by way of channel 166 to enable clipper output gates 158 and 162.

Microprocessor output terminal 270 leads to an optical coupler 272 whose output is connected by way of channel 274 to the transmission gate 118 to control the center sample from which the base current signal is developed.

Referring again to FIG. 5, trace A represents the raw weld current as appearing at terminal A, FIGS. 2–4. It will be noted that for this example the weld current varies radically from a value of about 100 amperes up to about 200 amperes.

Curve B is a plot, on the same scale as trace A, of the output of the clipper-voltage follower 116 and, more particularly, the wave form appearing at point B of FIG. 3. It will be noted that the wide variations due to the clipping action and filtering action are substantially eliminated.

Trace C is a plot of the weld current as it appears at terminal C of FIGS. 2–4. It will be noted that during the period of the sample gate C1 that there is a slight deviation of approximately 10% of the total weld current indicating that there is a difference between the instantaneous value of the weld current at the traverse center line and the average value as reflected by the output of the integrator.

Trace D represents the input to the voltage-to-frequency converter 134 and thus illustrates the portion D1 which is the voltage applied to converter 134 during the time gate C1. The portion of the curve D2 represents the wave form applied to converter 134 following the center line sample.

Section D3 is the area where the integration takes place. The voltage represented by the section D3 of trace D is thus the area that is involved in the integration at the end of the traverse following the center sample D1.

Thus, in accordance with the present invention, the output of gate 110 is applied to integrator 112, 114 which is a short-time constant integrator. The resultant voltage is applied by channel 128 to one input of subtraction unit 126. Actuation of gate 118 at each traverse center point causes the integrator 120, 122 to obtain and retain a sample representative of the current at the center point. This sample appears at the output of voltage follower 124. The output of subtractor 126 represents the difference between the outputs of the two integrators which, thus in effect, serve as current signal conditioners or filters.

The output of subtractor 126 is gated through multiplexer 130 for conversion to a variable frequency signal by converter 134. The variable frequency signal output is selected on a time basis through lines 236 and 238 so that near the ends of each traverse the variable frequency signal is applied to microprocessor 140. Microprocessor 140 then counts the pulses for integration through use of a down counter as previously described.

The integration reference level is the number of pulses initially in the down counter. This is first generated during initial start-up and is modified dynamically during the welding operation. By conditioning the signals applied to the frequency converter 134, the control of the welding process through the microprocessor 140 has been found to be rendered far more reliable and versatile than in prior art systems.

In one embodiment of the invention, multiplexer 130 was of type CD4052. Converter 134 was of type AD537. Microprocessor controller 140 was of the type manufactured and sold by R.C.A. and identified as CDP18S601. Couplers 235, 237, 252, 262 and 272 were optical couplers identified as HCPL2502. The gates 110 and 118 were identified as BG201.

FIG. 6

Bug 20 of FIG. 1 is comprised of two main parts. A main bug housing has two sets of idlers 22 and 24 for following band 14. It contains a mechanism whereby the torch assembly 30 can be moved independently in accordance with any of arrows 44, 46 or 48 in FIG. 1. A second housing is a tractor assembly which is adjustably hinged to the main bug body and which itself is provided with two sets of idlers, such as idlers 22 and 24. In addition the second housing is provided with a mounting and drive motor for the tractor wheels 26 and 28, shown figuratively in FIG. 1.

Figure 6:
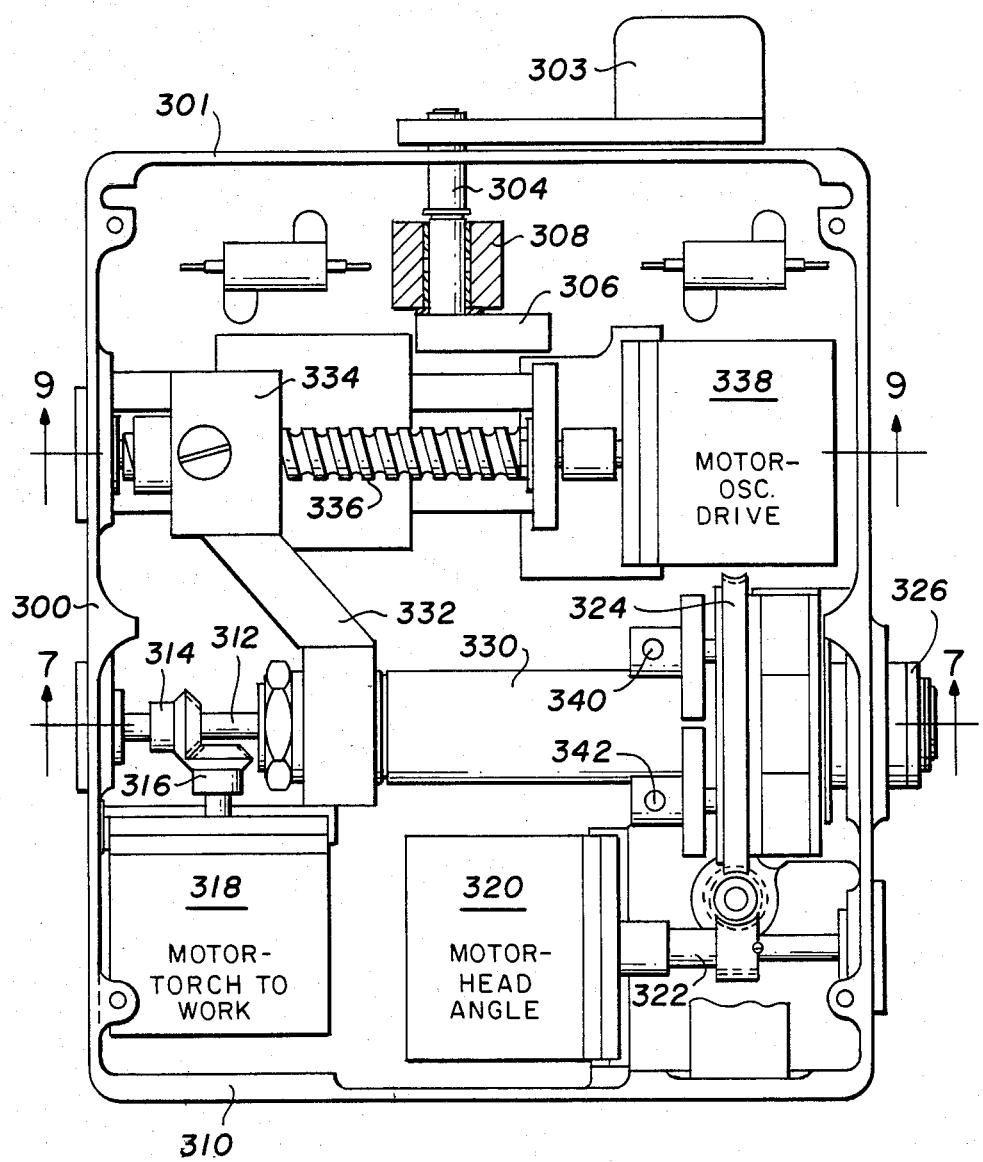
FIG. 6 is a top view of the main bug body interior.

FIG. 6 is a view of the inside arrangement of the main bug body such as viewed from line 6—6 of FIG. 1. The main bug body comprises a rectangular housing 300 having a free end 301 beneath which two sets of follower rollers such as rollers 22 and 24 are mounted and are actuated by way of a lever 303 which is coupled by way of a shaft 304 to an eccentric 306. Shaft 304 is mounted in a bearing 308.

The end 310 opposite the free end 301 is adapted to be hinged to a tractor assembly as will be described. The linkage may be such as to accommodate various sizes of pipes, generally in the manner disclosed in U.S. Pat. No. 3,844,468.

A splined shaft 312 extends laterally through the housing 300. A bevel gear 314 mounted on shaft 312 is driven by way of a bevel gear 316 on the output shaft of a motor 318. Motor 318 drives shaft 312 to control movement of the torch in the direction of arrow 46, FIG. 1. Motor 318 will thus be referred to as the torch-to-work motor. The coupling from shaft 312 to the torch assembly 30 will later be described.

A second motor 320 is mounted in housing 300 and is coupled through the assembly involving shaft 312 to adjust the head angle, i.e., the angle between the axis of the nozzle 40 FIG. 1 and the surface over which the bug travels. Thus motor 320 will be designated as the head angle motor. Motor 320 drives an output shaft 322 which, through a suitable gear train causes a large ring gear 324 to rotate causing the end of the main tubular shaft member 326 to rotate. The torch assembly 30 is to be connected to the flange 326 so that as the gear 324 is rotated the head angle of the torch assembly will be changed.

As previously mentioned, shaft 312 supports an enlarged tubular outer shaft 330. At the inboard end of shaft 330 there is mounted a follower arm 332. Arm 332 has a traveling nut mounted in the end 334 thereof which follows a worm gear 336. Gear 336 is driven by a motor 338. Motor 338 is an oscillator drive motor. It is a motor that causes shaft 330 with its end flange 326 to move in and out in accordance with the motion represented by arrow 48 of FIG. 1. Thus motor 338 is designated as the oscillator drive motor.

Main shaft 330 is flattened on opposite sides. The flat portions are engaged by follower rollers mounted on shafts 340 and 342 so that as motor 320 is actuated the motion of gear 324 will be transmitted to main shaft 330 through the rollers 340 and 342, at the same time accommodating the oscillation produced by actuation of the drive motor 338.

Figure 7:
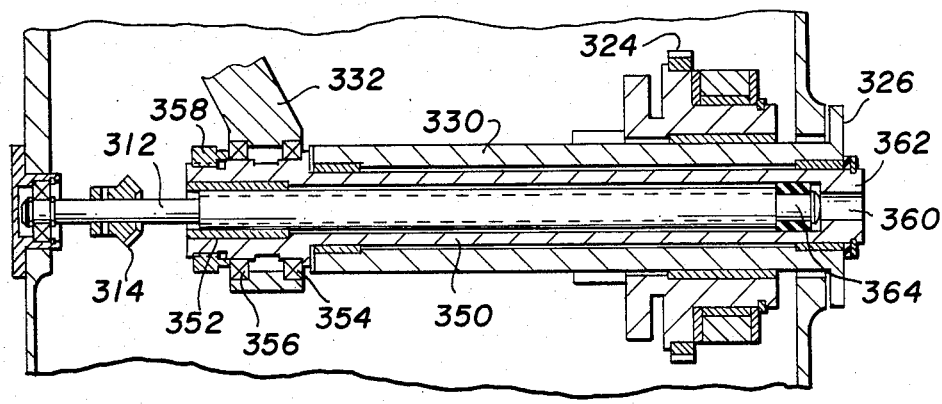
FIG. 7 is a partial sectional view taken along the lines 7—7 of FIG. 6.

In order to better understand the functions carried out through shaft 312 and 330 reference should now be had to FIG. 7 where a sectional view of the triple function shaft is shown.

FIG. 7

The central shaft 312 extends coaxially through the main shaft 330. An intermediate shaft 350 has a spline bushing 352 mounted in the left end thereof. Arm 332 is mounted on bearings 354 and 356 on the end of the intermediate shaft 350 so that shaft 350 may rotate relative to arm 332. Bearings 354 and 356 are fixed in place by action of an end nut 358 which is served on the end of intermediate shaft 350. Thus as shaft 312 rotates, the splines on the exterior surface thereof register in spline bushing 352. This causes the intermediate shaft 350 to rotate. Intermediate shaft 350 is provided with an end bore 360 with a keyway 362 therein. The end of shaft 312 opposite pinion 314 is mounted in an idler bearing 364.

Thus the shaft arrangement shown in FIG. 7 permits the intermediate shaft 350 to be driven from motor 318 to adjust the head angle. It accommodates rotation of the output flange 326 in response to actuation of motor 320 which drives the main shaft 330 through gear 324. It also permits transmission of rotary motion of the shaft 350 to the torch assembly 30 to adjust the torch to work distance.

FIG. 8

Figure 8:
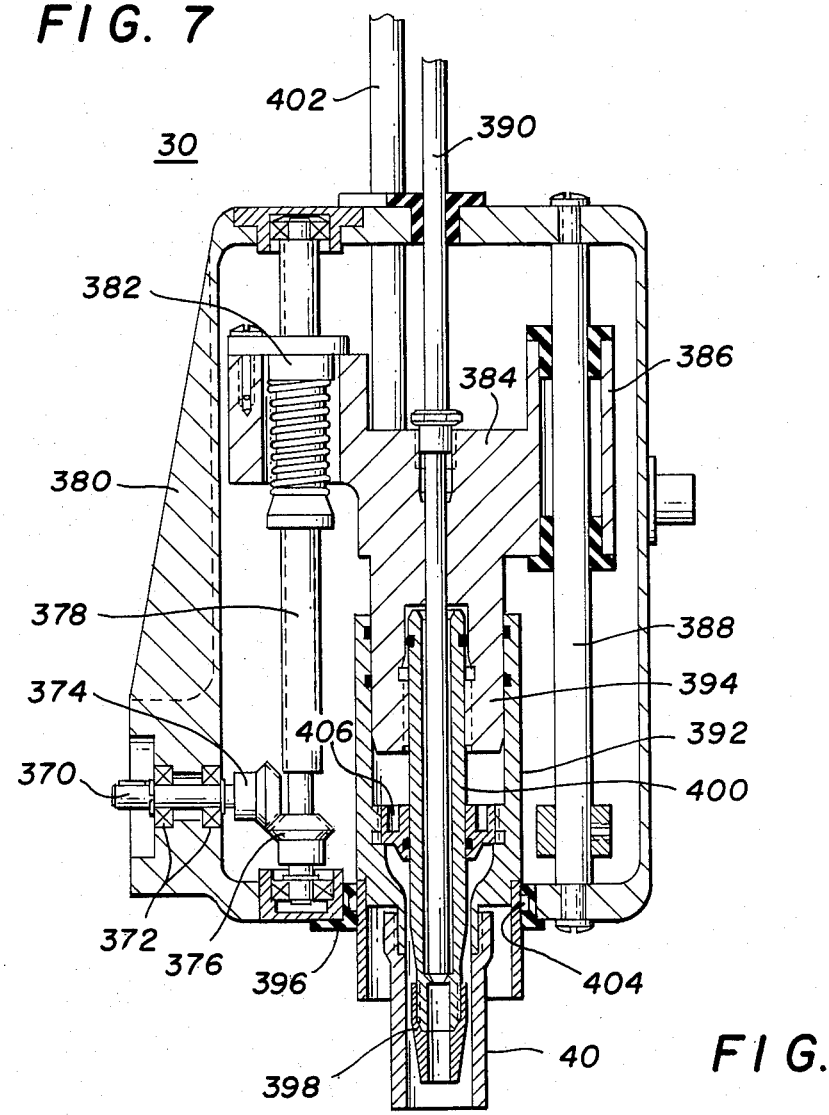
FIG. 8 is an elevation sectional view showing the torch assembly of FIG. 1.

Referring now to FIG. 8 the torch assembly 30 is illustrated in a sectional view with the keyed input shaft 370 shown in position to be inserted into the end bore 360 of FIG. 7. Shaft 370 is journaled in bearings 372 and has a pinion 374 mounted on the end thereof. Pinion 374 mates with pinion 376 which is mounted on a shaft 378. Shaft 378 extends vertically through the housing 380 of the head assembly. Shaft 378 is threaded to form a lead screw on which there is mounted an antiback lash follower nut 382. As shaft 370 is rotated, the lead screw 378 rotates causing the nut 382 to move up or down. The nut 382 supports the torch assembly including a torch body 384. Torch body 384 includes a guide arm 386 which follows a guide post 388 which is parallel to lead screw 378.

The torch body 384 is center bore to receive the filler wire guide tube 390. The lower end of the body 384 is a cylindrical section 394 and is counterbored from the bottom. A cylindrical nozzle body 392 is mounted on the cylindrical end portion 394 of the torch body 384 and extends downward through an insulating lower bushing 396 in the bottom of the housing 380. A nozzle 398 is mounted in the end of insert 392.

Mounted inside the counterbored section 394 of the torch body 384 is a welding tip through which the feed wire from tube 390 is threaded.

The nut 382 and the bushings in follower 386 which support torch body 384 are of insulating material for electrical isolation of the parts thereof relative to the housing 380. Insert 392 and the central nozzle structure 400 are electrically conductive.

Pressure seals are provided between the cylindrical section 394 of the torch body 384 and the cylindrical parts 392 and 400.

Pressurized shielding gas is applied through tube 402 to pressurize the cavity 404. A gas lens 406 mounted in insert 392 evenly distributes the flow of gas down through the annulus between the inner walls of insert 392 and the outer walls of the member 400 so that a uniform cylindrical sheath of gas flows out of nozzle 40 and shields the arc produced as the filler wire in tube 390 contacts work below nozzle 40 for the establishment and utilization of an arc.

FIG. 9

Figure 9:
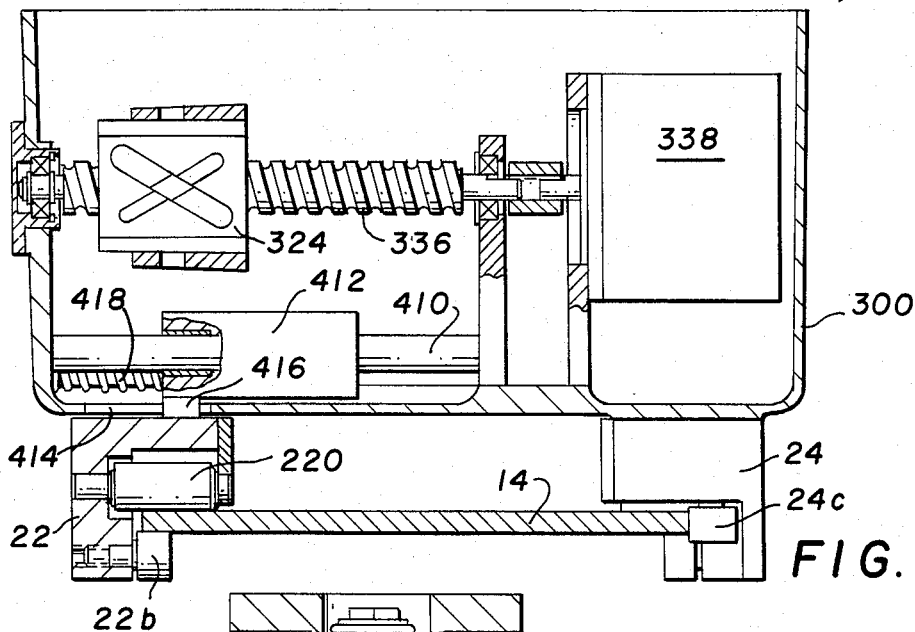
FIG. 9 is a sectional view taken along the lines 9—9 of FIG. 6.

In FIG. 9, a cross-section of a portion of the main bug housing taken along lines 9—9 of FIG. 6 illustrates the threaded shaft 336 with its follower 324 with shaft 336 driven by motor 338.

Also illustrated in FIG. 9 are further details of the guide rollers 22 and 24. The set of rollers 24 is mounted in a fixed relation on the bottom of housing 300. In contrast, the set of rollers 22 is mounted on a shaft 410 which shaft is supported from the walls of the housing 300 and is positioned near the bottom of the housing 300. A slider 412 is mounted on shaft 410 and is coupled through a slot 414 by a spacer 416 to the frame in which the rollers 22 are mounted. The slider 412 is urged by spring 418 toward followers 24. The eccentric 306, FIG. 6, as actuated by crank arm 303, FIG. 6, serves to move slider 412 away from followers 24 in order to permit the bug to be mounted onto the guideband 14. When mounted, the set of rollers 22 includes roller 22a which engages the outer surface of band 14. Roller 22b engages the inner surface of band 14. A third roller, such as roller 24c, engages the edge of band 14.

FIG. 10

Figure 10:
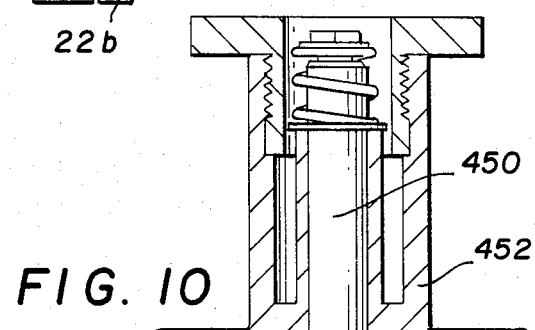
FIG. 10 is an elevation view partially in section of the traction assembly.
Figure 10:
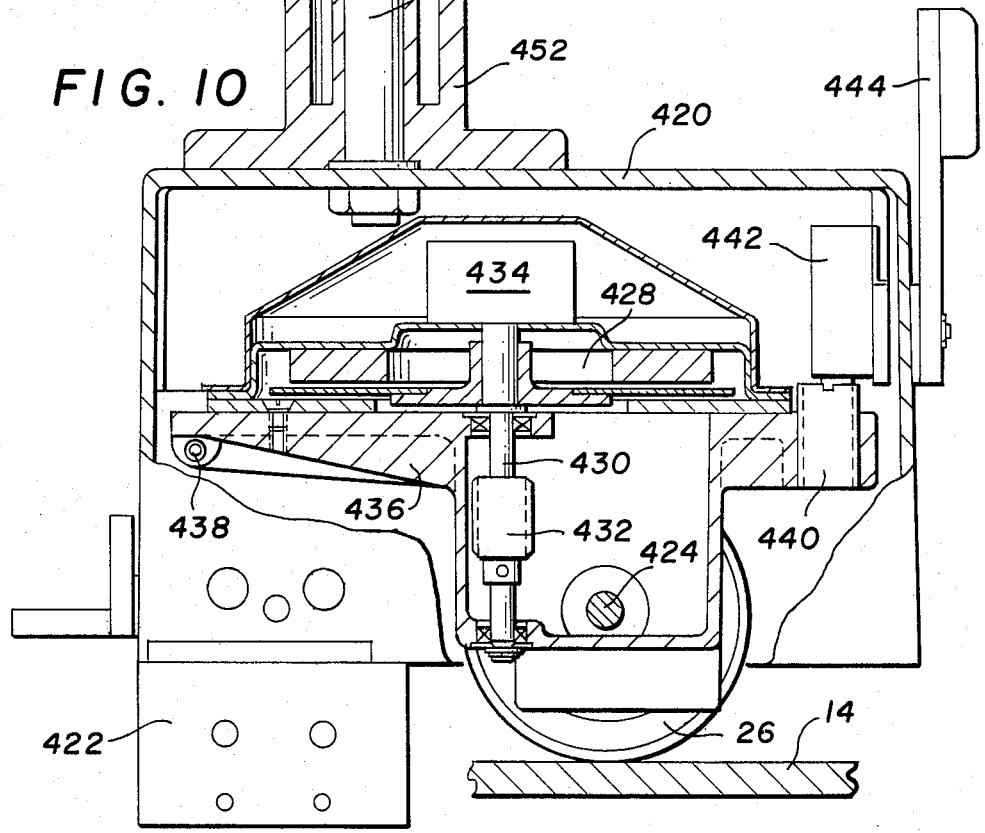

FIG. 10 is a cross-sectional view of the tractor assembly forming the second part of the welding bug. The tractor assembly has a housing 420 provided with two sets of band followers. One set is mounted on the frame member 422.

A shaft 424 supports the drive wheel 26. Drive wheel 26 is driven by a pancake motor 428 by way of shaft 430 and output gear 432. Gear 432 is connected through a suitable drive train to drive shaft 424. Motor 428 is provided with an optical encoder 434. The motor 428 is mounted on a subframe 436 which also supports shaft 424. The frame 436 is pivoted on a cross shaft 438 at one end of the housing 420. Thus, the motor 434 and the drive wheel 26 are rotatable about shaft 438. A spring-biased plunger 440 is mounted in frame 436 at the end thereof opposite shaft 438. An eccentric 442 mounted on a shaft common to crank arm 444 is utilized to apply a downward force through the spring-biased plunger 440 to force the drive wheel 26 onto the surface of the band 14 in order to generate the desired tractive force from motor 428 through wheel 26.

A spindle 450 is mounted in the top of frame 420 and serves to support a bobbin 452 on which a spool of filler wire may be mounted in order to supply the torch assembly 30 of FIGS. 1 and 8.

The tractor assembly housing 420 of FIG. 10 is to be hingedly coupled to the confronting end 310 of the main bug housing 300, FIG. 6. The coupling (not shown) may be of the type to permit the followers 22 and 24 on the main bug housing 300 and the followers such as followers in set 422, FIG. 10, both to be mounted on band 14 with the angle between the housings adjustable to accommodate different diameters of pipe to be welded.

I claim:

1. In automatic arc welding where a weld torch follows lateral traverses across a groove during travel along the length of said groove and the weld torch provides an arc current, the combination comprising:
   (a) means to produce a control signal representative of the difference between the arc current near the end of each of said traverses and the base arc current at the center of said traverse;
   (b) means to produce the integral of said control signal; and
   (c) means to arrest travel of said torch on each said traverse each time the integral of control signal reaches a reference value.

2. In automatic arc welding where a weld torch follows lateral traverses across a groove during travel along the length of said groove and the weld torch provides an arc current, the combination comprising:
   (a) means to produce a control signal representative of the difference between the arc current near the end of each traverse and the base arc current at the center of said traverse;
   (b) means to produce the integral of said control signal;
   (c) means to arrest lateral travel of said torch on each said traverse each time the integral of said control signal reaches a reference value; and
   (d) means automatically to establish on each said traverse the point at which the integration of said control signal begins.

3. In automatic arc welding where a weld torch follows lateral traverses across a groove during travel along the length of said groove and the weld torch provides an arc current and associated weld voltage, the steps of:
   (a) establishing a signal voltage proportional to the arc current;
   (b) integrating said signal voltage on short-time basis;
   (c) storing a condition representative of said signal voltage each time said torch passes the center of said groove;
   (d) subtracting said condition from said integrated signal voltage to produce a difference signal; and
   (e) utilizing said difference signal to control the location and extent of said lateral traverses across said groove.

4. The combination set forth in claim 3 in which said signal voltage is interrupted when said signal voltage exceeds or falls below a preset level by predetermined amounts.

5. The combination set forth in claim 3 in which said signal voltage is terminated at said step of integrating when the weld voltage on said torch falls below a predetermined level.

6. In automatic arc welding where a weld torch follows lateral traverses across a groove during travel along the length of said groove and the weld torch provides an arc current and associated weld voltage, the combination comprising:
   (a) means for establishing a signal voltage proportional to the arc current;

(b) means for integrating said signal voltage on a short time basis to produce an integrated voltage;

(c) means for storing a condition representative of said signal voltage each time said torch passes the center of said groove;

(d) means for subtracting said condition from said integrated voltage to produce a different signal; and (e) means for utilizing said difference signal to control the location and extent of said lateral traverses across said groove.

7. In automatic arc welding where a weld torch follows lateral traverses as to weave across a groove during travel along the length of said groove and the weld torch provides an arc current and associated weld voltage, the combination comprising:

(a) a shunt through which the arc current passes for establishing a signal voltage across said shunt proportional to the arc current;

(b) means for integrating said signal voltage on a short-time basis to produce a first integral function;

(c) means for integrating said first integral function on a long-time basis each time said torch passes the center of said groove for producing a second integral function;

(d) means for subtracting said second integral function from said first integral function to produce a difference function; and (e) means for utilizing said difference function to control the location and extent of said lateral traverses across said groove.

8. The combination set forth in claim 7 which includes means for interrupting integration of said signal voltage on said short-time basis when said signal voltage exceeds or falls below a preset level by predetermined amounts.

9. The combination set forth in claim 7 in which means are provided for interrupting integration of said signal voltage when the weld voltage on said torch falls below a predetermined level.

10. In automatic arc welding where a weld torch follows lateral traverses across a groove during travel along the length of said groove and the weld torch provides an arc current, the combination comprising:

(a) means for establishing a signal voltage proportional to the arc current;

(b) means for integrating said signal voltage on short-time basis;

(c) means for storing a condition representative of signal voltage each time said torch passes the center of said groove; and (d) means for subtracting said condition from said integrated signal voltage to produce a difference signal for control of said weld torch position.

* * * * *

UNITED STATES PATENT AND TRADEMARK OFFICE
CERTIFICATE OF CORRECTION

PATENT NO. : 4,495,400
DATED : Jan. 22, 1985
INVENTOR(S) : Floyd M. Thompson

It is certified that error appears in the above-identified patent and that said Letters Patent is hereby corrected as shown below:

```
Column 2, line 16, after "DETAILED DESCRIPTION", insert
     (on next line, centered) --FIGURE 1--.
Column 6, line 30, change "normal" to --nominal--.
Column 7, line 39, change "function" to --functions--.
```

Signed and Sealed this

Fifteenth Day of October 1985

[SEAL]

Attest:

DONALD J. QUIGG

Attesting Officer

Commissioner of Patents and
Trademarks—Designate